United States Patent [19]

Li

[11] Patent Number: 5,503,253
[45] Date of Patent: Apr. 2, 1996

[54] BRAKE SHOE ASSEMBLY FOR A BICYCLE BRAKE DEVICE

[75] Inventor: Jung-Hua Li, Chang-Hua, Taiwan

[73] Assignee: Ah-Ping Lin, Chang-Hua, Taiwan

[21] Appl. No.: 344,921

[22] Filed: Nov. 25, 1994

[51] Int. Cl.$^6$ ........................................... B62L 1/02
[52] U.S. Cl. ........................ 188/24.12; 188/24.11
[58] Field of Search ..................... 188/24.11, 24.12, 188/24.14, 24.15, 24.19, 24.21, 73.1

[56] References Cited

U.S. PATENT DOCUMENTS 5,113,975  5/1992  Zucchero .......................... 188/24.12

FOREIGN PATENT DOCUMENTS 3009023  5/1993  WIPO ............................. 188/24.12

Primary Examiner—Robert J. Oberleitner
Assistant Examiner—Chris Schwartz
Attorney, Agent, or Firm—Panitch Schwarze Jacobs & Nadel

[57] ABSTRACT

A brake shoe assembly for a bicycle brake device includes a brake shoe with an inverted U-shaped mounting seat and a brake pad fixed to the mounting seat. A U-shaped connecting seat is received in the mounting seat. The length of the connecting seat is smaller than that of the mounting seat. At least two pairs of transversely aligned guiding slots are formed in two opposite side walls of the connecting seat. At least one of the pairs of the guiding slots has two first upwardly inclined lower sections and two wavy sections connected to the respective first lower sections. The remaining of the pairs of guiding slots have two second upwardly inclined lower sections and two linear sections connected to the respective second lower sections. At least two rivets are fixed respectively to the mounting seat and at least one of the rivets passes through at least one of the guiding slots. The remaining of the rivets pass through the remaining pairs of the guiding slots. A spring member is mounted between the mounting seat and the connecting seat to urge at least one of the rivets to abut the lowest ends of the first lower sections, and to urge the remaining of the rivets to abut the lowest ends of the second lower sections.

4 Claims, 7 Drawing Sheets

BRAKE SHOE ASSEMBLY FOR A BICYCLE BRAKE DEVICE

BACKGROUND OF THE INVENTION

1. Field of the Invention

This invention relates to a brake shoe assembly, more particularly to a brake shoe assembly for a bicycle brake device.

2. Description of the Related Art

Referring to FIG. 1, a conventional brake shoe assembly for a bicycle brake device is shown to comprise a brake shoe 1, a hollow rectangular connecting seat 2, a spring member 3 and two rivets 4. The brake shoe 1 includes a brake pad 101 and a hollow rectangular mounting seat 102. The mounting seat 102 is inverted U-shaped in cross section and is formed of a top wall 103 to which the brake pad 101 is connected and two side walls 104 depending from the top wall 103 of the mounting seat 102. The top wall 103 and the side walls 104 of the mounting seat 102 cooperatively define a cavity 105. The connecting seat 2 is received in the cavity 105 of the mounting seat 102. The connecting seat 2 is U-shaped in cross section and the bottom wall 201 thereof is connected to a shaft projection 202, as shown in FIG. 2. Two opposite side walls 203 of the connecting seat 2 have two pairs of guiding slots 204 formed therein. Each of the pairs of guiding slots 204 are aligned transversely with one another, as best illustrated in FIG. 1. Each of the guiding slots 204 has an upwardly inclined lower section 2041 and a linear section which extends in the direction from a first end 206 of the connecting seat 2 to an opposite second end 207 of the connecting seat 2. Each of the upwardly inclined lower sections 2041 has a lowest end 2043 and an uppermost end 2044. Each of the linear sections 2042 of the guiding slots 204 is connected to the uppermost end of a corresponding one of the upwardly inclined lower sections 2041 of the guiding slots 204.

The two rivets 4 pass respectively through the two pairs of holes 106 (only two holes are shown in a side wall 104) of the side walls 104 of the mounting seat 102 and the two pairs of guiding slots 204 and are fixed to the side walls 104 of the mounting seat 102. The connecting seat 2 has a length which is smaller than that of the mounting seat 102. Therefore, the spring member 3 may be disposed between the first end 206 of the connecting seat 2 and the end 107 of the mounting seat 102 in order to urge the connecting seat to move away from the end 107 of the mounting seat 102 to cause the rivets 4 to abut the lowest ends 2043 of the guiding slots 204, as best illustrated in FIG. 2.

The shaft projection 202 of the connecting seat 2 of the conventional brake shoe assembly is adapted to extend through a bolt 5 which is connected to a brake arm 6 of a bicycle brake device, as best illustrated in FIG. 3. The structure and operations of the bicycle brake device are well known to those skilled in the art. When the bicycle brake device is operated, the pair of brake arms 6 are rotated about the respective pivots 7 to bring the opposed brake shoes 1 of two conventional brake shoe assemblies into contact with opposite sides of the rims 8 of the wheel 9 to exert a braking force. At this time, the connecting seats 2 will be pulled toward the ends 107 of the mounting seats 102 when the rivets 4 are moved along the guiding slots 204 from the lowest end 2043 to the dead end of the linear sections 2042 against the biasing force of the spring members 3. It has been found that the above described conventional brake shoe assembly may provide a larger instantaneous braking force. However, if the rider applies an excessive force to the bicycle brake device, an excessive braking force will be exerted on the wheel of the bicycle, thereby causing the wheel to be locked. When the wheel of the bicycle is locked suddenly by the brake shoe assembly of the conventional bicycle brake device, the wheel will begin to slide and the rider may lose his/her balance and fall down to the ground, thus resulting in injuries.

SUMMARY OF THE INVENTION

It is therefore a main object of this invention to provide a brake shoe assembly which can prevent the wheel of a bicycle from being locked when the brake shoe assembly exerts an excessive braking force on the wheel of the bicycle.

Accordingly, the brake shoe assembly for a bicycle brake device of this invention comprises:

a brake shoe including a brake pad and a hollow rectangular mounting seat, the mounting seat being inverted U-shaped in cross section and being formed of a top wall with a first face and a second face opposite to the first face of the top wall, two opposite side walls and first and second end walls, the side walls and the first and second end walls of the mounting seat depending from the second face of the top wall to define a cavity with a rectangular opening, the brake pad being fixed to the first face of the top wall of the mounting seat, the two side walls of the mounting seat having at least two pairs of transversely aligned holes formed therein;

a hollow rectangular connecting seat received in the cavity of the mounting seat, the connecting seat being U-shaped in cross section and being formed of a bottom wall with a first face and a second face that is opposite to the first face of the bottom wall, two opposite side walls and first and second end walls, the side walls and the first and second end walls of the connecting seat extending upwardly from the first face of the bottom wall, the second face of the bottom wall being provided with a shaft projection that is adapted to be connected to a bolt of the bicycle brake device, the connecting seat having a length which is smaller than that of the mounting seat, the side walls of the connecting seat having at least two pairs of guiding slots formed therein, each of the pairs of guiding slots being aligned transversely with one another, at least one of the pairs of the guiding slots having two first upwardly inclined lower sections and two wavy sections which extend in a direction from the first end wall of the connecting seat to the second end wall of the connecting seat, each of the upwardly inclined lower sections having a lowest end and an uppermost end, each of the wavy sections being connected to the uppermost end of a corresponding one of the upwardly inclined lower sections, the remaining of the pairs of guiding slots having two second upwardly inclined lower sections and two linear sections which extend in the direction from the first end wall of the connecting seat to the second end wall of the connecting seat, each of the second upwardly inclined lower sections having a lowest end and an uppermost end, each of the linear sections being connected to the uppermost end of a corresponding one of the second upwardly inclined lower sections;

at least two rivets fixed respectively to the at least two pairs of transversely aligned holes of the mounting seat, at least one of the rivets passing through the at least one of the pairs of guiding slots, the remaining of the rivets passing through the remaining pairs of the guiding slots; and a spring member disposed in the cavity of the mounting seat between the first end wall of the mounting seat and the first end wall of the connecting seat to urge the at least one of the rivets to abut the lowest ends of the first upwardly inclined lower sections, and to urge the remaining of the rivets to abut the lowest ends of the second upwardly inclined lower sections.

BRIEF DESCRIPTION OF THE DRAWINGS

Other features and advantages of this invention will become apparent in the following detailed description of the preferred embodiments of this invention with reference to the accompanying drawings, of which.

DETAILED DESCRIPTION OF THE PREFERRED EMBODIMENTS

Figure 4:
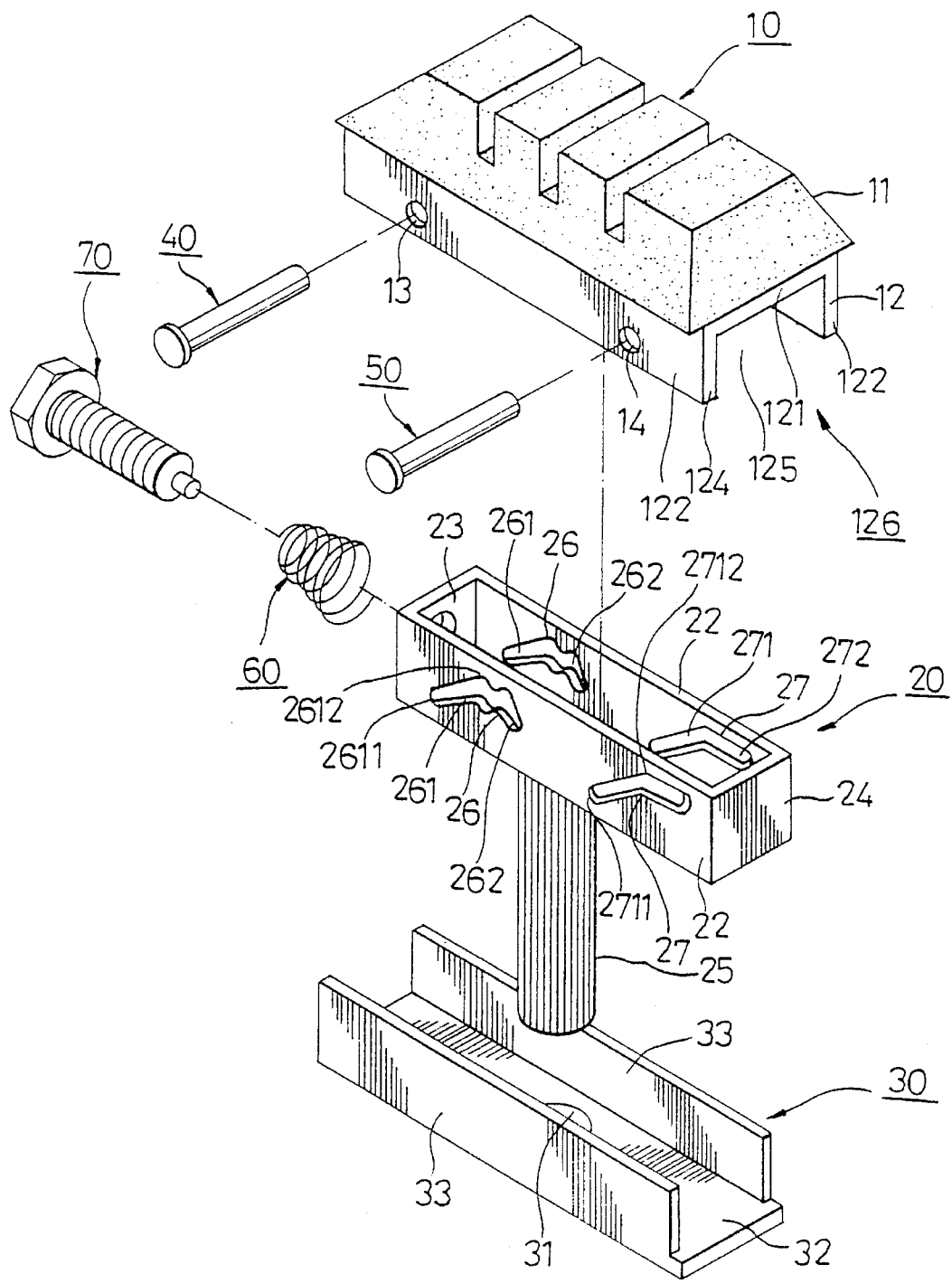
FIG. 4 is a perspective exploded view of a first preferred embodiment of a brake shoe assembly of this invention.

Referring to FIG. 4, a brake shoe assembly for a bicycle device of this invention is shown to comprise a brake shoe 10, a hollow rectangular connecting seat 20, a cover member 30, two rivets 40, 50, a spring member 60 and a screw member 70.

Figure 5:
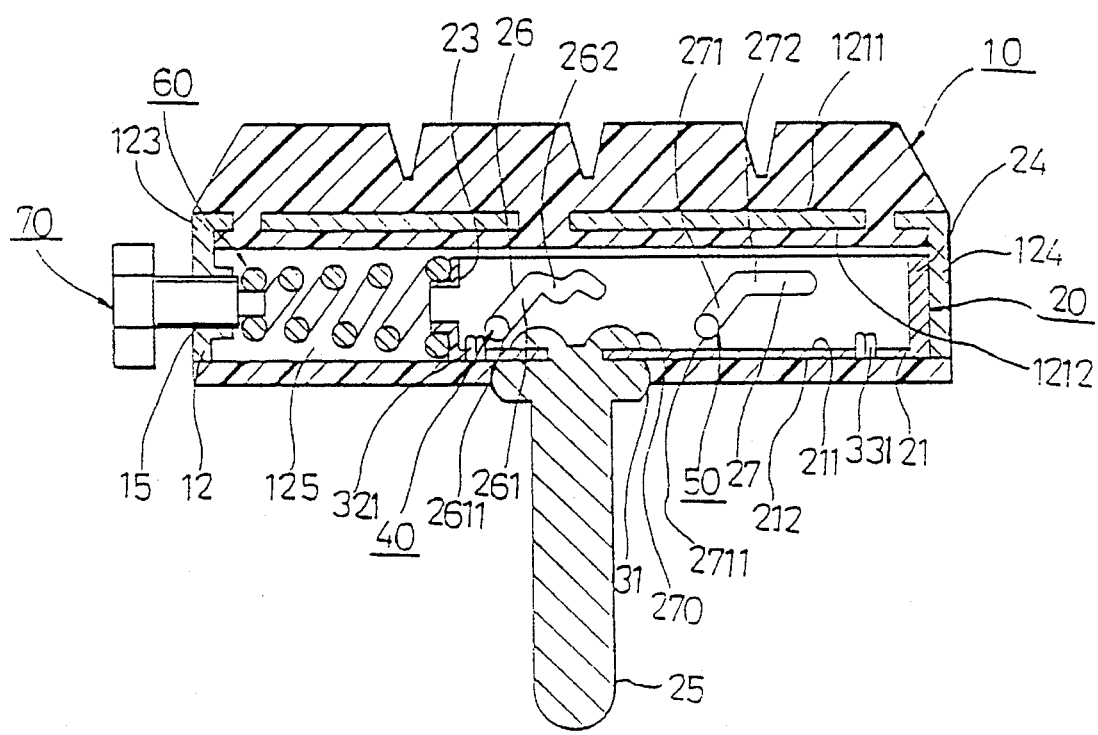
FIG. 5 is a sectional side view of the first preferred embodiment of the brake shoe assembly of this invention.

Referring to FIGS. 4 and 5, the brake shoe 10 includes a brake pad 11 and a hollow rectangular mounting seat 12. The mounting seat 12 is inverted U-shaped in cross section and is formed of a top wall 121 with a first face 1211 and a second face 1212 opposite to the first face 1211 of the top wall 121, two opposite side walls 122, and first and second end walls 123 and 124. The side walls 122 and the first and second end walls 123 and 124 depend from the second face 1212 of the top wall 121 to define a cavity with a rectangular opening 126. The brake pad 11 is fixed to the first face 1211 of the top wall 121 of the mounting seat 12. The two side walls 122 of the mounting seat 12 have two pairs of transversely aligned holes 13, 14 formed therein (only two of the holes are shown in one of the side walls 122). The first end wall 123 of the mounting seat 12 has a threaded hole 15 formed therein.

The hollow rectangular connecting seat 20 is received in the cavity 125 of the mounting seat 12, as best illustrated in FIG. 5. The connecting seat 20 is U-shaped in cross section and is formed of a bottom wall 21 with a first face 211 and a second face 212 that is opposite to the first face 211 of the bottom wall 21. The connecting seat 20 also has two opposite side walls 22 and first and second end walls 23 and 24. The side walls 22 and the first and second end walls 23 and 24 extend upwardly from the first face 211 of the bottom wall 21. The second face 212 of the bottom wall 21 is provided with a shaft projection 25 that is adapted to be connected to a bolt of a bicycle brake device in a known manner as described hereinbefore. The connecting seat 20 has a length which is smaller than that of the mounting seat 12.

Referring again to FIG. 4, the side walls 22 of the connecting seat 20 have first and second pairs of guiding slots 26 and 27 which are provided respectively near the first and second end walls 23 and 24. Each of the first and second pairs of guiding slots 26 and 27 are aligned transversely with one another. The first pair of the guiding slots 26 have two first upwardly inclined lower sections 261 and two wavy sections 262 which extend in a direction from the first end wall 23 of the connecting seat 20 to the second end wall 24 of the connecting seat 20. Each of the upwardly inclined lower sections 261 has a lowest end 2611 and an uppermost end 2612. Each of the wavy sections 262 is connected to the uppermost end 2612 of a corresponding one of the upwardly inclined lower sections 261. The second pair of guiding slots 27 have two second upwardly inclined lower sections 271 and two linear sections 272 which extend in the direction from the first end wall 23 of the connecting seat 20 to the second end wall 24 of the connecting seat 20. Each of the second upwardly inclined lower sections 271 has a lowest end 2711 and an uppermost end 2712. Each of the linear sections 272 is connected to the uppermost end 2712 of a corresponding one of the second upwardly inclined lower sections 271.

Referring once more to FIG. 5, the two rivets 40, 50 are fixed respectively to the two pairs of transversely aligned holes 13, 14 of the mounting seat 12. The first rivet 40 passes through the first pair of guiding slots 26 and the second rivet 50 passes through the second pair of guiding slots 27. The spring member 60 is disposed in the cavity 125 of the mounting seat 12 between the first end wall 123 of the mounting seat 12 and the first end wall 23 of the connecting seat 20. The spring member 60 urges the first rivet 40 to abut the lowest ends 2611 of the first upwardly inclined lower sections 261 of the first pair of guiding slots 26, and further urges the second rivet 50 to abut the lowest ends 2711 of the second upwardly inclined lower sections 271 of the second pair of guiding slots 27. The second end walls 24 of the connecting seat 20 abut the second wall 124 of the mounting seat 12. The screw member 70 has an end threaded through the threaded hole 15 of the mounting seat 12 so as to abut the spring member 60 so that the tension force of the spring member 60 can be adjusted by rotating the screw member 70. When the rider is too heavy or when the rider is used to actuating the bicycle brake device With a large force, the tension force of the spring member 60 may be adjusted to a larger extent by threading the screw member 70 into the cavity 125 of the mounting seat 12. On the contrary, the tension force of the spring member 60 may be adjusted to a lesser extent by means of threading the screw member 70 out from the cavity 125 of the mounting seat 12.

Referring to FIGS. 4 and 5, the cover member 30 is U-shaped in cross section and is formed of a base 32 and two side walls 33. The base 32 of the cover plate 30 has a hole 31 through which the shaft projection 25 passes. The base 32 of the cover member 30 is connected to the bottom wall 21 of the connecting seat 20 by means of two fasteners 321, 331 with the side walls 33 of the cover member 30 abutting external faces of the side walls 122 of the mounting seat 12 in order to cover the rectangular opening 126 of the mounting seat 12. Therefore, dust and water cannot enter the interior of the brake shoe assembly of this invention. This can prolong the service life of the brake shoe assembly.

Figure 1:
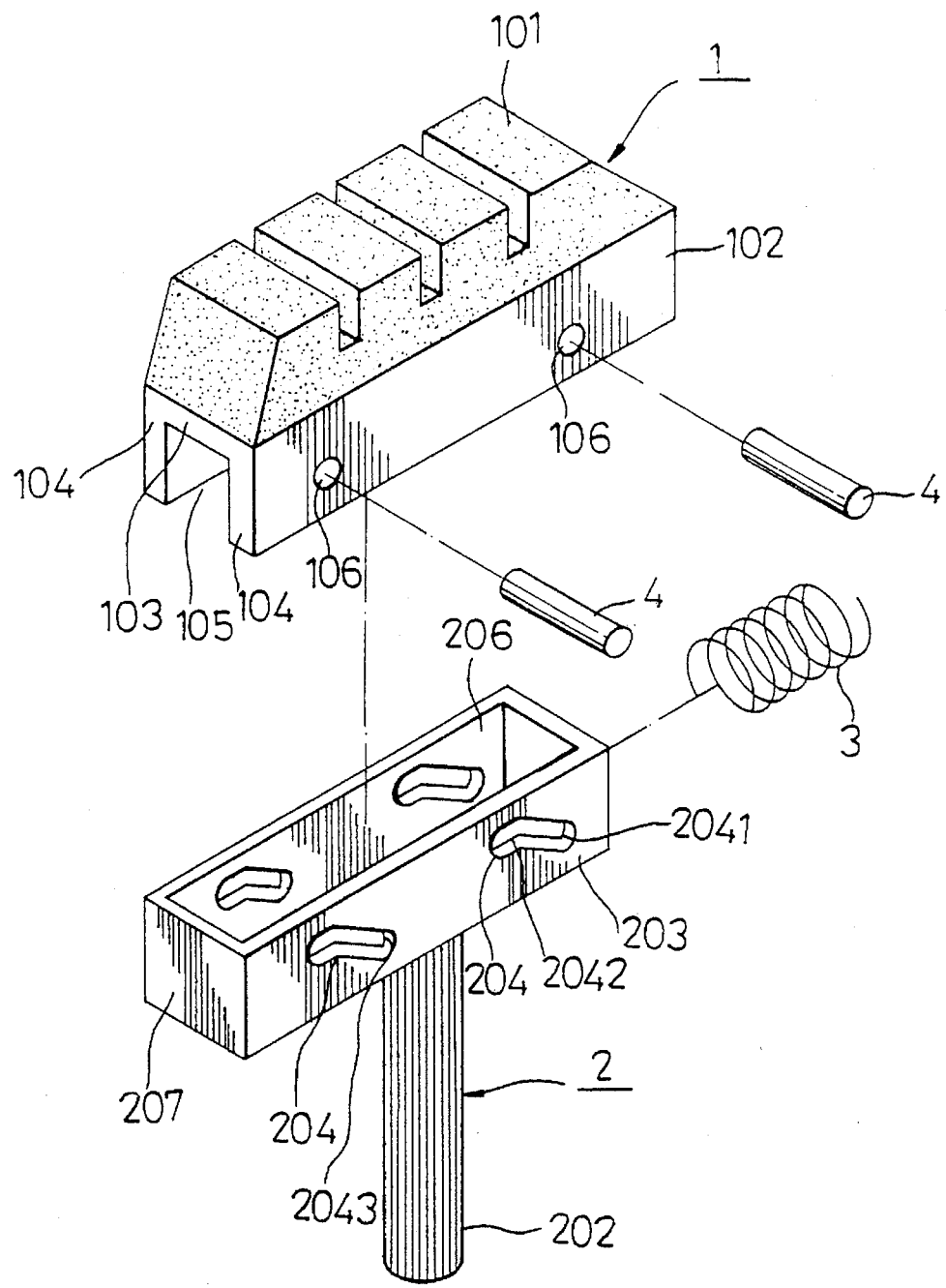
FIG. 1 is a perspective exploded view of a conventional brake shoe assembly.
Figure 2:
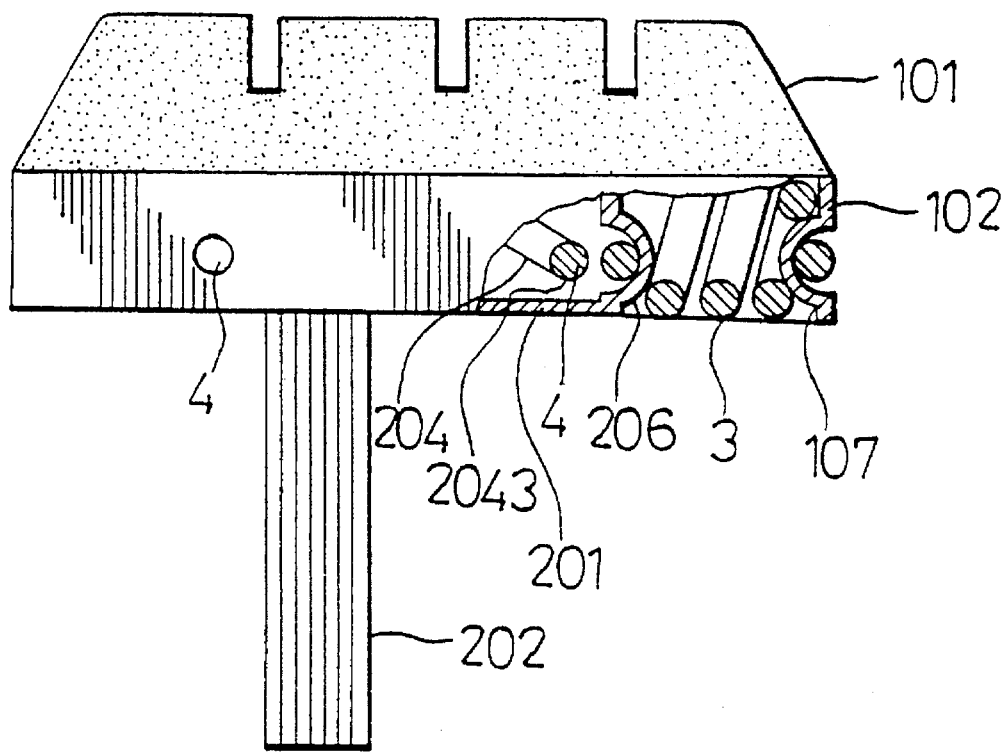
FIG. 2 is a partially sectional side view of the conventional brake shoe assembly of FIG. 1.
Figure 3:
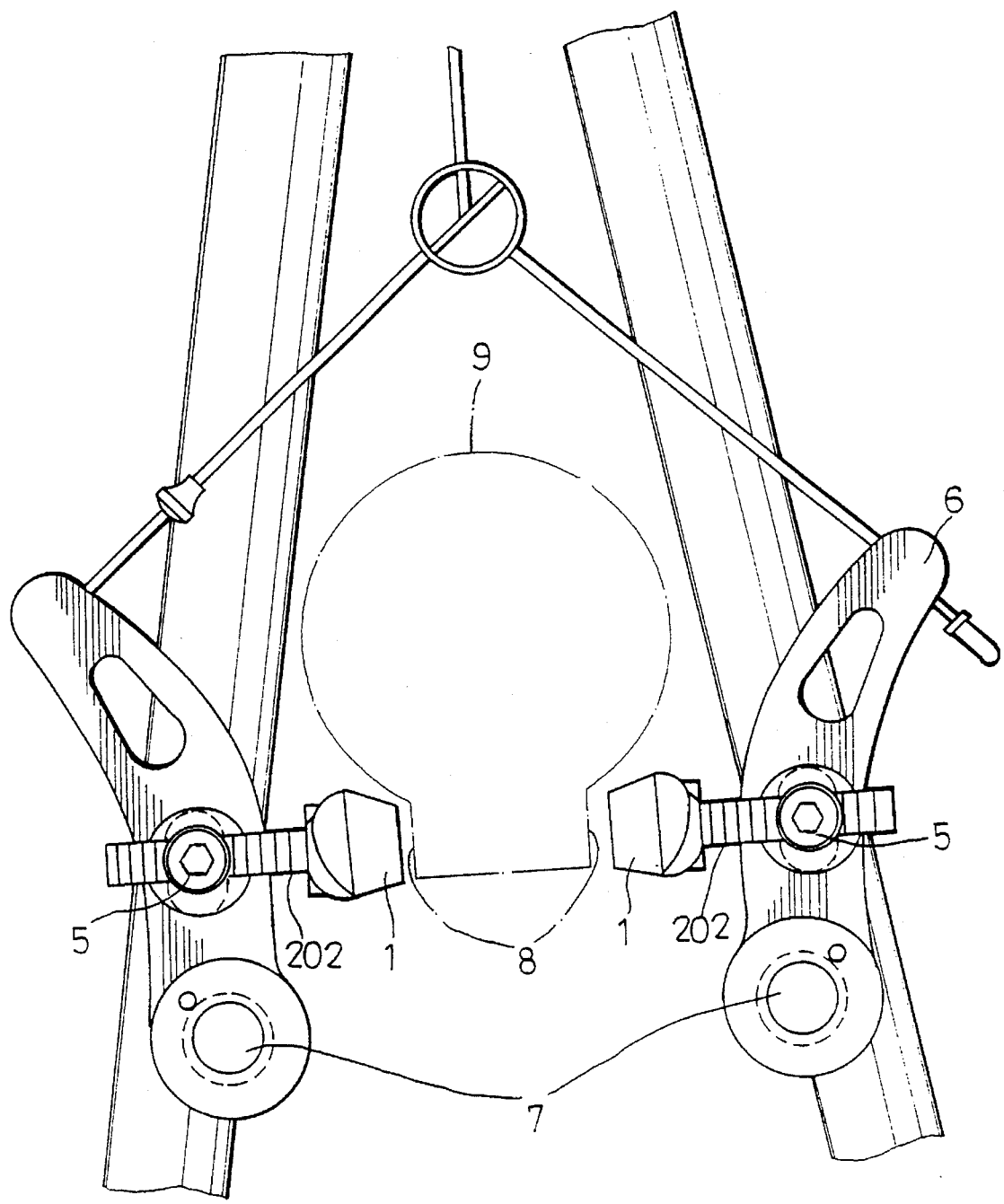
FIG. 3 is a schematic view illustrating the conventional brake shoe assembly of FIG. 1 when mounted to a bicycle brake device.
Figure 6:
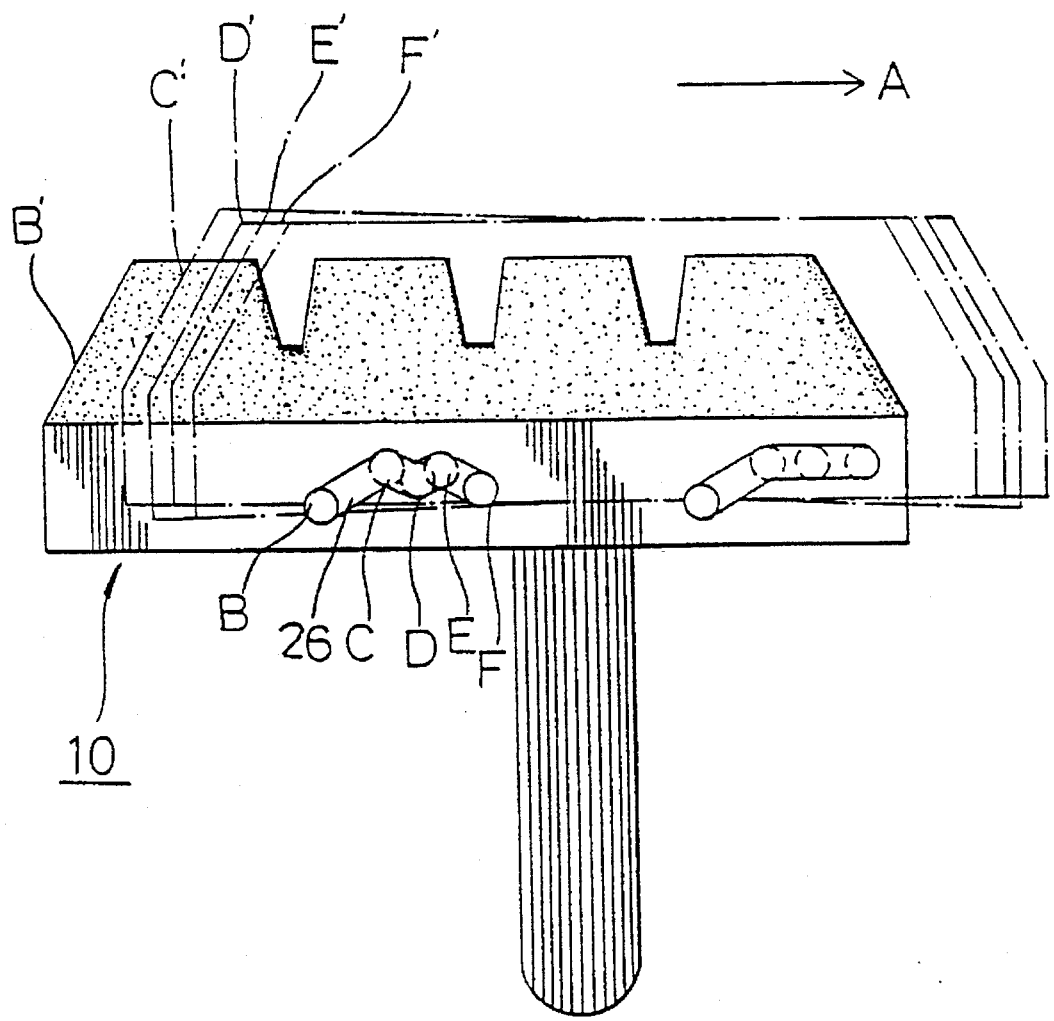
FIG. 6 is a schematic view illustrating the brake shoe assembly of FIG. 1 when in an operative position.

FIG. 6 is a schematic view illustrating the brake shoe assembly of FIG. 1 when in an operative position in which the bicycle wheel rotates in the direction that is indicated by an arrow A. When the bicycle brake device is operated, the brake shoes 10 of the brake shoe assembly of this invention come into contact with the rim of the wheel to exert a braking force as previously described. When the braking force is greater than the tension force of the spring member 60, the brake shoe 10 will be forced to move in the direction (A) with the rivets 40 and 50 moving respectively along the two pairs of guiding slots 26 and 27 of the connecting seat 20. When the first rivet 40 is moved to the positions (C), (D), (E), and (F) from the position (B), in which the first rivet 40 is located in the lowest ends 2611 of the guiding slots 26, the brake shoe 10 correspondingly moves to the positions (C'), (D'), (E'), and (F') from the position (B'), as shown in the phantom lines of FIG. 6. That is to say, the left end of the brake shoe 10 will move up and down while the right end of the brake shoe 10 will move upwardly and then move horizontally and to the right during the braking of the wheel of the bicycle. Therefore, the contact surface area of the brake shoes 10 and the rim of the wheel will be alternatively increased and decreased, thereby preventing the bicycle wheel from being locked while braking. This effect is somewhat similar to that produced in the anti-brake-blocking-system which is applied conventionally to the braking system of the automobile.

Figure 7:
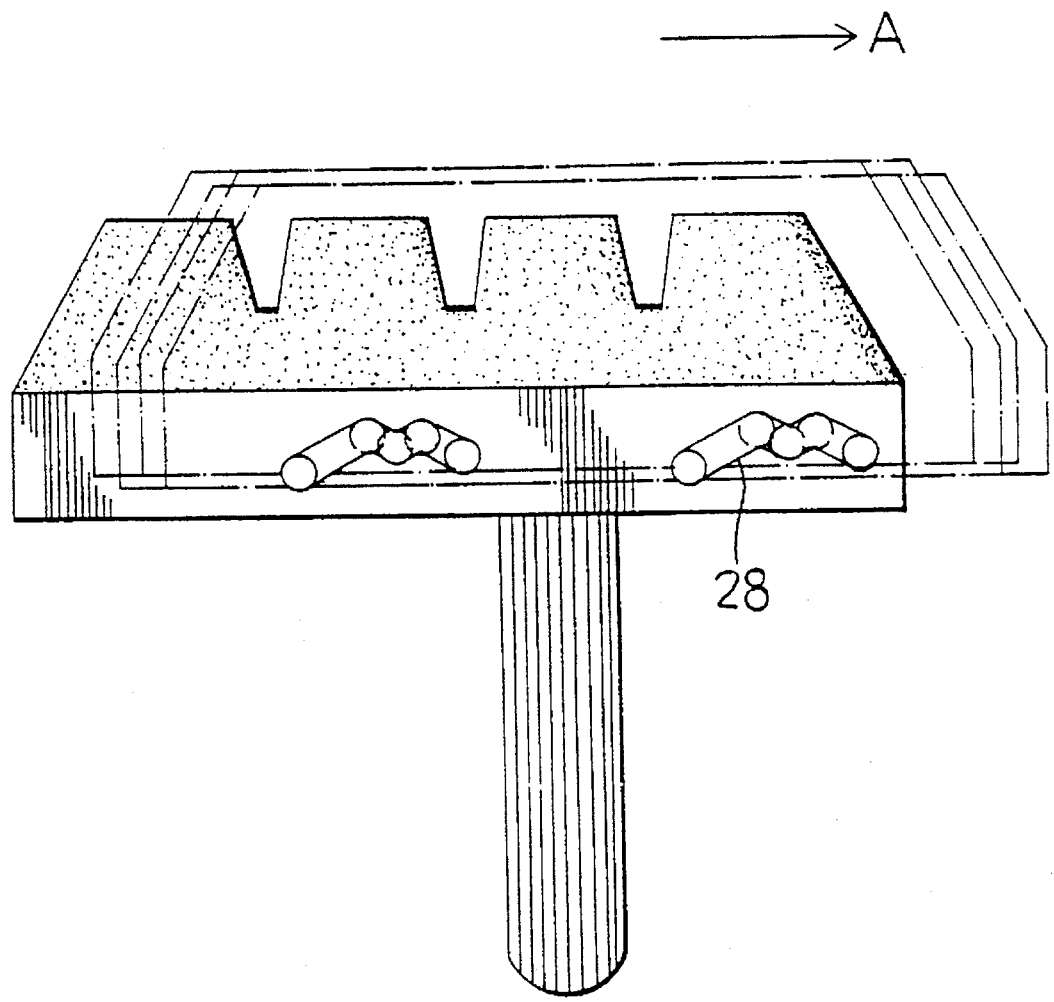
FIG. 7 is a schematic view illustrating a second preferred embodiment of a brake shoe assembly of this invention when in an operative position.

FIG. 7 shows a schematic view of a second preferred embodiment of a brake shoe assembly of this invention when in an operative position. In this embodiment, the structure of the brake shoe assembly is similar to that of the brake shoe assembly of the first embodiment except that the second pair of guiding slots 28 is in the form of the first pair of guiding slots 26 of the first embodiment instead of being in the form of the second pair of guiding slots 27 of the first embodiment. Therefore, the left and right ends of the brake shoe 10 will both move up and down simultaneously during the braking of the wheel of the bicycle. This movement will allow the contact faces of the brake shoes 10 and the rim of the wheel to alternatively engage and disengage each other, thereby preventing the bicycle wheel from being locked while braking.

With this invention thus explained, it is apparent that numerous modifications and variations can be made without departing from the scope and spirit of this invention. It is therefore intended that this invention be limited only as indicated in the appended claims.

I claim:

1. A brake shoe assembly for a bicycle brake device comprising:

a brake shoe including a brake pad and a hollow rectangular mounting seat, said mounting seat being inverted U-shaped in cross section and being formed of a top wall with a first face and a second face opposite to said first face of said top wall, two opposite side walls and first and second end walls, said side walls and said first and second end walls of said mounting seat depending from said second face of said top wall to define a cavity with a rectangular opening, said brake pad being fixed to said first face of said top wall of said mounting seat, said two side walls of said mounting seat having at least two pairs of transversely aligned holes formed therein;

a hollow rectangular connecting seat received in said cavity of said mounting seat, said connecting seat being U-shaped in cross section and being formed of a bottom wall with a first face and a second face that is opposite to said first face of said bottom wall, two opposite side walls and first and second end walls, said walls and said first and second end walls of said connecting seat extending upwardly from said first face of said bottom wall, said second face of said bottom wall being provided with a shaft projection that is adapted for connection to said bicycle brake device, said connecting seat having a length which is smaller than that of said mounting seat, said side walls of said connecting seat having at least two pairs of guiding slots formed therein, each of said pairs of guiding slots being aligned transversely with one another, at least one of said pairs of guiding slots having two first upwardly inclined lower sections and two wavy sections which extend in a direction from said first end wall of said connecting seat to said second end wall of said connecting seat, each of said upwardly inclined lower sections having a lowest end and an uppermost end, each of said wavy sections being connected to said uppermost end of a corresponding one of said upwardly inclined lower sections, the remaining of said pairs of guiding slots having two second upwardly inclined lower sections and two linear sections which extend in the direction from said first end wall of said connecting seat to said second end wall of said connecting seat, each of said second upwardly inclined lower sections having a lowest end and an uppermost end, each of said linear sections being connected to said uppermost end of a corresponding one of said second upwardly inclined lower sections;

at least two rivets fixed respectively to said at least two pairs of transversely aligned holes of said mounting seat, at least one of said rivets passing through said at least one of said pairs of said guiding slots, the remaining of said rivets passing through the remaining pairs of said guiding slots; and a spring member disposed in said cavity of said mounting seat between said first end wall of said mounting seat and said first end wall of said connecting seat to urge said at least one of said rivets to abut said lowest ends of said first upwardly inclined lower sections, and to urge the remaining of said rivets to abut said lowest ends of said second upwardly inclined lower sections.

2. A brake shoe assembly for a bicycle brake device as claimed in claim 1, wherein said first end wall of said mounting seat has a threaded hole formed therein, and a screw member having an end threaded through said threaded hole of said mounting seat so as to abut said spring member, tension force of said spring member being adjustable by rotating said screw member.

3. A brake shoe assembly for a bicycle brake device as claimed in claim 1, further comprising a cover member which is U-shaped in cross section, said cover member being formed of a base and two side walls, said base of said cover plate having a hole through which said shaft projection passes, said base of said cover member being connected to said bottom wall of said connecting seat with said side walls of said cover member abutting external faces of said side walls of said mounting seat in order to cover said opening of said mounting seat.

4. A brake shoe assembly for a bicycle brake device comprising:

a brake shoe including a brake pad and a hollow rectangular mounting seat, said mounting seat being inverted U-shaped in cross section and being formed of a top wall with a first face and a second face opposite to said first face of said top wall, two opposite side walls and first and second end walls, and said side walls and said first and second end walls of said mounting seat depending from said second face of said top wall to define a cavity with a rectangular opening, said brake pad being fixed to said first face of said top wall of said mounting seat, said two side walls of said mounting seat having at least two pairs of transversely aligned holes formed therein;

a hollow rectangular connecting seat received in said cavity of said mounting seat, said connecting seat being U-shaped in cross section and being formed of a bottom wall with a first face and a second face that is opposite to said first face of said bottom wall, two opposite side walls and first and second end walls, said walls and said first and second end walls of said connecting seat extending upwardly from said first face of said bottom wall, said second face of said bottom wall being provided with a shaft projection that is adapted for connection, said connecting seat having a length which is smaller than that of said mounting seat, said side walls of said connecting seat having at least two pairs of guiding slots formed therein, each of said pairs of guiding slots being aligned transversely with one another, each one of said pairs of said guiding slots having two first upwardly inclined lower sections and two wavy sections which extend in a direction from said first end wall of said connecting seat to said second end wall of said connecting seat, each of said upwardly inclined lower sections having a lowest end and an uppermost end, each of said wavy sections being connected to said uppermost end of a corresponding one of said upwardly inclined lower sections, at least two rivets fixed respectively to said at least two pairs of transversely aligned holes of said mounting seat, at least one of said rivets passing through said at least one of said pairs of said guiding slots, the remaining of said rivets passing through the remaining pairs of said guiding slots; and a spring member disposed in said cavity of said mounting seat between said first end wall of said mounting seat and said first end wall of said connecting seat to urge said at least one of said rivets to abut said lowest ends of said first upwardly inclined lower sections, and to urge the remaining of said rivets to abut said lowest ends of said second upwardly inclined lower sections.

* * * * *